United States Patent [19]

Sakakibara et al.

[11] Patent Number: 4,681,712
[45] Date of Patent: Jul. 21, 1987

[54] MOLDING PROCESS FOR PLASTICS

[75] Inventors: Takao Sakakibara, Kasugai; Tsunehiko Toyoda, Yokohama; Yoshihisa Nagashima, Hiratsuka, all of Japan

[73] Assignees: Dai Nippon Toryo Co., Ltd., Osaka; Tokai Kogyo Co., Ltd., Aichi, both of Japan

[21] Appl. No.: 792,841

[22] Filed: Oct. 30, 1985

[30] Foreign Application Priority Data

Nov. 5, 1984 [JP] Japan .................................. 59-233003

[51] Int. Cl.⁴ ........................... B29C 41/08; B29B 9/12
[52] U.S. Cl. .......................................... 264/24; 264/25;
264/512; 264/104; 264/105; 264/118; 264/131;
264/255; 264/328.7; 264/338; 264/DIG. 65;
427/25
[58] Field of Search ................... 264/24, 25, 309, 104,
264/DIG. 65, 328.7, 255, 105, 132, 131, 338,
512; 427/25

[56] References Cited

U.S. PATENT DOCUMENTS

| | | | |
|---|---|---|---|
| 3,478,387 | 11/1969 | Ruekberg | 264/24 |
| 3,504,063 | 3/1970 | Lemelson | 264/24 |
| 3,930,061 | 12/1975 | Scharfenberger | 264/309 |
| 4,205,028 | 5/1980 | Brueggemann et al. | 264/309 |
| 4,367,192 | 1/1983 | Arnason | 264/328.2 |
| 4,378,322 | 3/1983 | Atterbury et al. | 264/104 |
| 4,474,685 | 10/1984 | Annis | 264/105 |
| 4,499,235 | 2/1985 | Verwer et al. | 264/255 |
| 4,530,779 | 7/1985 | Mayama et al. | 264/104 |
| 4,536,364 | 8/1985 | Lindskog | 264/338 |
| 4,568,604 | 2/1986 | Kurtz et al. | 264/255 |

FOREIGN PATENT DOCUMENTS 56-111650  9/1981  Japan .................................. 264/24

Primary Examiner—Jeffery Thurlow
Attorney, Agent, or Firm—Oblon, Fisher, Spivak, McClelland & Maier

[57] ABSTRACT

A molding process for producing a molded plastic product with a resin coating layer formed on its surface, which comprises electrostatically coating a powdery resin composition on the inner surface of a mold, filling and molding a plastic material in the mold to form a molded plastic product, and plasticizing, under compression, said powdery resin composition by the heat of the filled plastic material and/or by the heat for molding the filled plastic material, to form a resin coating layer securely bonded to the surface of the molded plastic product by anchor effect.

14 Claims, 9 Drawing Figures

FIGURE I (A)
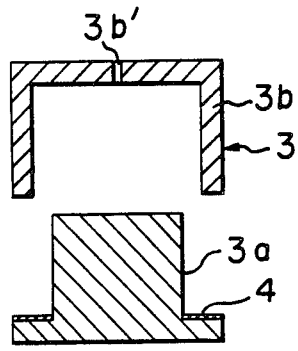
FIGURE I (B)
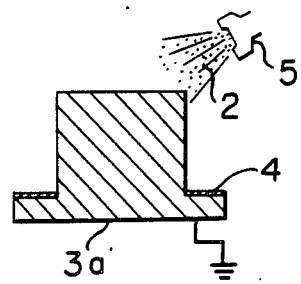
FIGURE I (C)
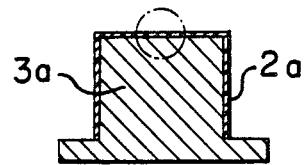
FIGURE I (D)
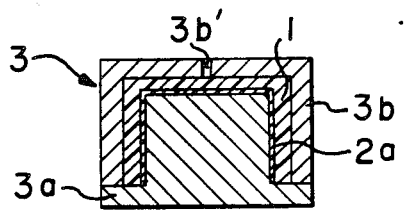
FIGURE I (E)
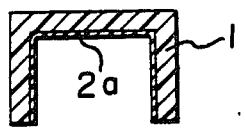

MOLDING PROCESS FOR PLASTICS

The present invention relates to a molding process for plastics, and more particularly to a molding process for plastics in which a uniform resin coating layer is formed on a molded plastic product by using a powdery resin composition.

In recent years, molded plastic products are widely used in various fields. For instance, various plastic products are used for automobile parts, household electric appliances or housings for electronic devices containing integrated circuits or LSI elements.

It is common to apply various coatings on such molded plastic products to increase the commercial values, to maintain the harmony with the surrounding parts, to improve the outer appearance or to provide protective coatings, or for the purpose of shielding electromagnetic waves generated from electronic appliances or of preventing electrostatic charges. Usually, a solvent-soluble coating material containing an electrically conductive fine powder or a coloring fine powder is coated on the outer surface of a plastic product or on the inner surface of a plastic housing by brush-coating or spray-coating. In such a method, precautions to avoid the color change or the impairment of the configuration due to the organic solvent contained in the coating material and special measures for improvement of the adhesion of the coating layer to the plastic substrate or for top coating for the prevention of peeling of the coating layer, are required, and due to the evaporation of the organic solvent into the atmosphere, there are problems of the odor, adverse effects to human health and a danger of fire.

Recently, there has been proposed a method wherein a solvent-soluble coating material is applied onto the inner surface of a mold for forming a housing for an electronic device, by a brush or by a spray gun, and then a plastic is molded in the mold to form a resin coating layer integrally on the molded plastic product (e.g. U.S. Pat. No. 4,497,763 and Japanese Examined Patent Publication No. 25061/1973). However, the above-mentioned problems inherent to the case where a solvent-soluble coating material is coated on the surface of a molded plastic material can not substantially be solved by such a method.

It is conceivable to use a powdery coating material containing no solvent, as a means to solve the above-mentioned various problems inherent to the solvent-soluble type coating material. In fact, in the field of molding, a method is known wherein a powdery coating material containing a small amount of a usual coloring pigment, is heated and preliminarily applied, by spreading or spraying, onto the inner surface of a mold for compression molding and then SMC (Sheet Molding Compound) or BMC (Bulk Molding Compound) is used for compression molding to form a protective or coloring coating layer on the surface of FRP (Fiber Reinforced Plastics) (e.g. Japanese Examined Patent Publication No. 44459/1983 and Japanese Unexamined Patent Publications No. 181823/1982 and No. 124610/1983). However, even such a method has problems such as the scattering of the powder, the adhesion of the powder to portions other than the mold and non-uniformity in the thickness of the formed layer.

Under the circumstances, it is a primary object of the present invention to overcome the above-mentioned drawbacks of the conventional methods, and to provide a molding process for plastics, whereby an electrically conductive coating layer or a coating layer having an improved outer appearance or protective function is formed on the surface of a plastic product.

The second object of the present invention is to provide a molding process for plastics, whereby a multilayer coating comprising an electrically conductive coating layer and a coating layer having a function to prevent the electrification or the electric leak of the conductive coating layer, or having an improved outer appearance and/or a protective function and optionally an antistatic function, is formed.

The third object of the present invention is to provide a molding method for plastics, whereby a multilayer coating comprising an electrically conductive coating layer and a wave absorbing coating layer capable of absorbing electromagnetic waves of a high frequency region and in some cases also capable of providing a function to prevent the electrification or the electric leak of the electrically conductive coating layer, is formed.

The primary object of the present invention can be attained by a molding process for producing a molded plastic product with a resin coating layer formed on its surface, which comprises electrostatically coating a powdery resin composition on the inner surface of a mold, filling and molding a plastic material in the mold to form a molded plastic product, and plasticizing, under compression, said powdery resin composition by the heat of the filled plastic material and/or by the heat for molding the filled plastic material, to form a resin coating layer securely bonded to the surface of the molded plastic product by anchor effect.

The specific manners for accomplishing the second and third objects of the present invention will be apparent from the following detailed description of the present invention.

In the accompanying drawings,

FIGS. 1A–1E is a diagrammatic illustration of a case where the process of the present invention is applied to injection molding.

Figure 2:
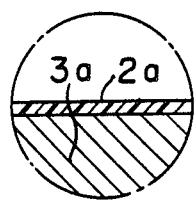
FIG. 2 is an enlarged view of the dotted line portion in step C in FIG. 1.
Figure 4:
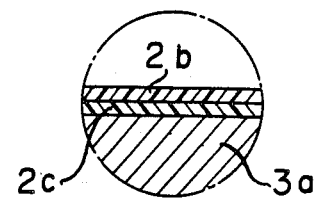
FIG. 4 is an enlarged view of a case wherein two layers of powdery resin compositions were applied in accordance with the process of the present invention.
Figure 3:
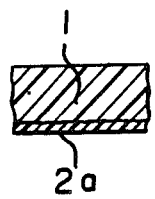
FIG. 3 is an enlarged view of the essential part of a molded plastic product thereby obtained.
Figure 5:
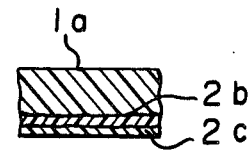
FIG. 5 is an enlarged view of the essential part of a molded plastic product thereby obtained.

In the Figures, reference numerals 1 and 1a indicate molded plastic products, numeral 2 indicates a powdery resin composition, numerals 2a, 2b and 2c indicate resin coating layers formed by powdery resin compositions, numerals 3a and 3b indicate molds, reference numeral 4 indicates a masking material, and numeral 5 indicates an electrostatic coating device.

The powdery resin composition to be used in the process of the present invention is preferably a thermosetting or thermoplastic resin composition having a particle size of from 0.5 to 100 μm, preferably from 1 to 50 μm.

As the thermosetting resin, there may be mentioned, for instance, an acrylic resin, a polyester resin, an epoxy resin, an alkyd resin, a urethane resin, an epoxy-modified polyester resin and an acrylate-modified polyester resin. An acrylic resin, a polyester resin and an epoxy resin are particularly preferred in view of the storage stability and the properties of the coating layer thereby obtained.

There may be employed various types of thermosetting resins, such as self-curing type or curing agent- (or crosslinking agent-)curing type.

As the curing agents for the above thermosetting resins, there may be mentioned those which are commonly employed for thermosetting powdery coating materials, such as dicyandiamide, an acid anhydride, an imidazole derivative, an aromatic diamine, a boron trifluorideamine complex compound, a hydrazide, a decamethylene dicarboxylic acid, a block isocyanate compound and an amino resin.

As the thermoplastic resin, there may be mentioned conventional thermoplastic resins such as a polyester resin, polyethylene, polypropylene, a styrene polymer, a vinyl chloride polymer, a polyamide resin, a butyral resin, a cellulose resin and a petroleum resin.

The above-mentioned thermosetting resins or thermoplastic resins may be used alone or in combination as a mixture, or in some cases, it is also possible to employ a combination of a thermosetting resin and a thermoplastic resin.

In the present invention, the resin component for the powdery resin composition usually has a softening point of from 40° to 160° C., preferably from 60° to 130° C., as measured by Kofler's method, and a melting point of from 60° to 180° C., preferably from 70° to 160° C., as measured by Durran's method.

The electrically conductive powdery resin composition used in the process of the present invention, is a powdery resin composition containing an electrically conductive fine powder. The resin composition itself shows no substantial electric conductivity, but, when formed into a coating layer, shows an electric conductivity of not more than $10^2$ $\Omega/\square$ as the surface resistance.

The electrically conductive fine powder is a fine powder having good electric conductivity, such as a metal or alloy powder of gold, platinum, palladium, silver, copper, nickel, etc.; or a powder obtained by coating an electrically conductive metal on the surface of an electrically non-conductive inorganic powder or plastic powder, such as a nickel-coated mica powder. Such a fine powder usually has a particle size of from 0.5 to 100 μm, preferably from 1 to 50 μm. Such powders may be used alone or in combination as a mixture of two or more different kinds.

For the purpose of the present invention, i.e. for the purpose of obtaining a coating layer having good conductivity and adhesion, a metal fine powder of dendrite form is particularly effective.

The electrically conductive fine powder is contained in the electrically conductive powdery resin composition preferably in an amount of from 70 to 95% by weight, more preferably from 75 to 90% by weight.

In the present invention, the electrically conductive powdery resin composition includes (1) a composition in which all the electrically conductive fine powder is contained in individual resin powder particles, and (2) a mixture of electrically conductive fine powder particles and resin powder particles containing an electrically conductive fine powder (provided, the total amount of the electrically conductive fine powder is within the abovementioned range). In the latter case, it is of course necessary that the electric resistance in the powder form is sufficiently high for electrostatic coating.

If the amount of the electrically conductive fine powder in the electrically conductive powdery resin composition is less than 70% by weight, it is impossible to form a coating layer having good conductivity on the surface of a molded plastic product. On the other hand, if the amount exceeds 95% by weight, it becomes difficult to conduct electrostatic coating efficiently. Therefore, either case is not desirable.

The above-mentioned electrically conductive powdery resin composition (2) preferably comprises an electrically conductive fine powder and a powdery resin containing from 5 to 94% by weight of an electrically conductive fine powder, wherein the total content of the electrically conductive fine powder in the composition is within a range of from 70 to 95% by weight.

The electrically conductive powdery resin composition (2) has the following advantages:

(1) A conventional method for the production of a powdery resin composition, can be employed without change, and the electric conductivity can freely be controlled to meet the electric conductivity required for the particular coating layer by adjusting the amount of the electrically conductive fine powder to be mixed with the resin powder.

(2) If the composition is composed solely of an electrically conductive fine powder, it is difficult to conduct electrostatic coating. Whereas, as in the present invention, by the incorporation of an electrically insulating powdery resin, such a resin serves as a carrier, whereby a substantial amount of an electrically conductive fine powder can efficiently be coated by electrostatic coating.

(3) As compared with a powdery composition composed solely of a powdery resin containing an electrically conductive fine powder, there is a substantial amount of freely flowable electrically conductive fine powder particles, whereby the probability of the contact of the electrically conductive fine powder particles to one another becomes high, and when the powdery resin melts and flows during the layer forming operation, the electrically conductive fine powder particles outside the resin particles tend to spread for uniform distribution, whereby the conductivity of the resulting coating layer is improved.

The insulating powdery resin composition used in the process of the present invention is a powdery thermosetting or thermoplastic resin composition containing or not containing a coloring pigment which will be described hereinafter, and when formed into a coating layer, it provides a surface resistance of at least about $10^5$ $\Omega/\square$.

Needless to say, if a coloring pigment is used for the insulating powdery resin composition, a coating layer for an improved outer appearance is obtainable, and if a certain type of pigment is used, it is possible to obtain an antistatic coating layer.

As the coloring pigment to be used for the insulating powdery resin composition, there may be employed any coloring pigments or dyestuffs which are commonly used, for instance, inorganic pigments such as titanium oxide, zinc white, white lead, carbon black, chrome yellow, iron oxide, red oxide, ultramarine blue or chromium oxide, and organic pigments of azo type, vat dye type, quinacridone type, phthalocyanine type or nitroso type. These pigments may be used alone or in combination as a mixture of two or more different kinds.

Further, in the case where the insulating powdery resin composition of the present invention is used for the antistatic purpose (surface resistance: at least $10^5$ $\Omega/\square$, preferably at least $10^{10}$ $\Omega/\square$), an electrically conductive oxide such as $SnO_2$, $In_2O_3$ or $Sb_2O_3$, a metal-doped ZnO, $TiO_2$ coated on its surface with $In_2O_3$ or $SnO_2$, a non-crystalline carbon powder such as graphite carbon or acetylene black, or a small amount of the above-mentioned electrically conductive fine powders, may be used alone or in combination as a mixture, or in combination with the above-mentioned coloring pigment.

All of such additives will be hereinafter represented by the term "coloring pigment or the like".

The coloring pigment or the like is incorporated in the insulating powdery resin composition preferably in an amount of at most 80% by weight, more preferably at least 0.5% by weight.

In the present invention, when the insulating powdery resin composition is used also for an improved outer appearance, the coloring pigment or the like is required to be at least 0.5% by weight in the composition. On the other hand, if the amount exceeds 80% by weight, it becomes difficult to obtain a uniform coating layer, such being undesirable.

In the present invention, when the insulating powdery resin composition is used in combination with the coloring pigment or the like, the insulating powdery resin composition is meant for (1) a composition wherein all the coloring pigment or the like is contained in the individual resin powdery particles, or (2) a mixture comprising (a) resin powder particles containing a major proportion of the coloring pigment or the like and (b) a minor proportion of particles of the coloring pigment or the like (provided the total amount of the coloring pigment or the like is within the above-mentioned range).

The wave absorbing powdery resin composition used in the process of the present invention is a thermosetting or thermoplastic resin composition containing an electromagnetic wave absorbing fine powder. As the wave absorbing fine powder to be used for the wave absorbing powdery resin composition, ferrite particles of spinel type represented by the general formula of $M^{2+}O \cdot (Fe_2O_3)$ where M is a bivalent metal such as Ni, Zn or Mn, are preferred. As such particles, there may be mentioned ferrites such as $NiFe_2O_4$, $ZnFe_2O_4$, $MnFe_2O_4$, $CuFe_2O_4$, $Fe_3O_4$ or $CoFe_2O_4$, or composite ferrites of Ni-Zn type, Ni-Mn type or Mn-Zn type. These wave absorbing powders may be used alone or in combination as a mixture of two or more different kinds.

The above-mentioned spinel-type ferrite fine particles may be prepared by a conventional method, for instance, by a method disclosed in "Powder and Powder Metallurgy" Vol. 29, No.6, Page 12.

The wave absorbing fine particles used in the process of the present invention usually have a particle size of from 0.05 to 10 $\mu$m, and such particles are contained in the wave absorbing powdery resin composition preferably in an amount of from 50 to 95% by weight. If the amount of the wave absorbing fine particles is less than 50% by weight, the electromagnetic wave absorbing effects at the high frequency region can not be expected very much. On the other hand, if the amount exceeds 95% by weight, it becomes difficult to obtain a uniform coating layer. Therefore, either case is not desirable.

The wave absorbing powdery resin composition of the present invention is meant for (1) a composition wherein all the wave absorbing fine powder is contained in the individual resin powder particles, or (2) a mixture comprising (a) resin powder particles containing a major proportion of the wave absorbing fine powder, and (b) a minor proportion of the wave absorbing fine powder particles (provided, the total amount of the wave absorbing fine powder is within the above-mentioned range).

The above-mentioned powdery resin composition of the present invention may contain, in addition to the electrically conductive fine powder, coloring pigment or wave absorbing fine powder, other additives such as a flow-preventing agent, a curing agent, an antioxidant and a filler pigment.

Various powdery resin compositions to be used in the process of the present invention, may be prepared by conventional methods for powdery coating materials.

For instance, there may be employed a mechanical pulverization method in which the above-mentioned resin and the conductive fine powder, the wave absorbing fine powder or the coloring pigment, and, if necessary, a curing agent or various other additives, are heated and melt-mixed, then cooled, pulverized and sieved, or a dry spray method in which the above-mentioned resin and other components are dispersed in a solvent, and then the dispersion thereby obtained is sprayed in a heated atmosphere. It is particularly preferred to employ a precipitation method as described hereinafter, to obtain a composition containing the electrically conductive fine powder, the wave absorbing powder or the coloring pigment in a high concentration, to maintain the shape of the electrically conductive fine powder, to employ a resin having a low melting point, or to take into account the prevention of the coagulation of the powdery resin composition.

Namely, a liquid composition (hereinafter referred to as a "dispersion") obtained by dissolving the above-mention resin in a water-soluble solvent (the solubility in water being preferably from 10 to 30% by weight at 20° C.) such as an alcohol, an ethylene glycol derivative, a diethylene glycol derivative, an ester or a ketone, and then mixing the resin and, if necessary, the electrically conductive fine powder, etc., as well as a curing agent or other additives, is emulsified and dispersed in water in an amount sufficient to have all the water-soluble solvent in the dispersion dissolved (i.e. an amount from about 3 to about 40 times the amount of the dispersion). The emulsification can be conducted by a method in which the dispersion is dropwise added, injected or sprayed into water under vigorous stirring, or by a method wherein water and the dispersion is mixed in a line mixer.

The above stirring or the mixing in the line mixer is continued until the solvent in the emulsified fine particles has transferred into water and particles have been thereby formed.

Thus, the solvent in the emulsified fine particles is extracted into water, whereby resin particles are obtained.

The resin particles are separated from a water-solvent mixture by filtration or by centrifugal separation. Further, if necessary, washing with water and separation are repeated in a necessary number of times to obtain a slurry or a water-containing cake of resin particles. Then, if necessary, the particle size adjustment is conducted by a ball mill, a pot mill or a sand mill, and then the resin particles are dried, preferably by freeze-drying or vacuum drying, to avoid the coagulation of the resin particles, followed by sieving, if necessary, to obtain a powdery resin composition of the present invention.

Such a method for the preparation is described in detail, for instance, in Japanese Unexamined Patent Publication No. 52851/1973 or Japanese Examined Patent Publications No. 5832/1979, No. 26250/1979, No. 31492/1979, No. 5796/1981 and No. 29890/1981.

There is no particular restriction to the molding method to which the process of the present invention is applied. Namely, the present invention is applicable to any conventional molding methods, such as a compression molding method, a transfer molding method, a lamination molding method, an injection molding method (including reaction and liquid injection molding methods), a blow molding method and a vacuum molding method.

The process of the present invention is particularly effective for an injection molding method, a transfer molding method, a blow molding method or a vacuum molding method.

As the plastic material to be used for such molding methods, there may be mentioned thermosetting or thermoplastic resins which are commonly used for molding, such as an unsaturated polyester resin, a phenol resin, an epoxy resin, a urea or melamine resin, a styrene resin, an acrylic resin, a vinyl resin, a polyethylene resin, a silicone resin, an ABS resin, a nylon resin, a polyacetal resin, a polycarbonate resin, a polyphenylene oxide resin and a polypropylene resin. Further, there may be employed resin compositions obtained by mixing to these resins, additives such as a reinforcing fiber, a filler, a curing agent, a stabilizer, a coloring agent, a thickener, a releasing agent, a foaming agent, or a fire retardant, as well as a Sheet Molding Compound (SMC), a Bulk Molding Compound (BMC), etc.

Now, the molding process of the present invention will be described in detail.

Firstly, the powdery resin composition obtained as above is electrically charged by an application of a negative voltage of from $-30$ to $-90$ KV and electrostatically coated on the inner surface of a mold. The thickness of the coating layer is determined as required, and is usually from 10 to 200 $\mu$m.

In the case where a powdery resin composition is applied to form a second layer in accordance with the process of the present invention, the second electrostatic coating may be conducted in the same manner by an application of a negative charge of from $-30$ to $-90$ KV. The thickness of the second layer is usually from 10 to 200 $\mu$m.

After coating the powdery resin composition on the inner surface of the mold, a plastic material is filled in the mold and molded at a predetermined temperature and/or under a predetermined pressure. Thus, the powdery resin composition in the mold is plasticized by the heat of the plastic material and/or by the heat for molding, to form a uniform resin coating layer securely bonded to the surface of the molded plastic product by anchor effect.

The process of the present invention will be described in detail with reference to the typical injection molding method as illustrated in the drawings.

As shown in FIG. 1, in a preliminary step A, a masking material 4 is applied to the portion of a fixed mold half 3a where no coating is required. In a coating step B, a powdery resin composition 2 is applied to the surface of the fixed mold half 3a by an electrostatic coating device 5. In a case where a powdery resin composition is to be formed in a double layer structure, another layer is formed by electrostatic coating in the same manner.

Finally, the masking material is removed, and if necessary, the coated powdery resin composition 2 is heated and plasticized.

Then, in a molding step D, a movable mold half 3b is placed over the fixed mold half 3a to close the mold, and a molten plastic material is filled from a supply hole 3b' into the space in the mold, whereupon the plastic material is molded and, at the same time, a resin coating layer 2a is formed and securely bonded to the surface of the molded plastic product 1 by anchor effect.

Finally, the mold is removed, and a molded plastic product 1 with a resin coating layer 2a on its surface is taken out. Thus, a molded plastic product having a uniform resin coating layer can be obtained in good efficiency.

In the molding process of the present invention, it is preferred to preheat the mold. In the case of a mold at a normal temperature or a mold having a low preheating temperature, it is preferred to heat the powdery resin composition by a hot air, by electricity or by infrared irradiation, after coating the powdery resin composition. Thus, it is possible to avoid the scattering of the powdery resin composition, which is likely when the composition is deposited merely by the static electricity by the electrostatic coating.

The above-mentioned preheating of the mold is meant for the state where the mold temperature is higher than the normal temperature by the heat applied externally or by the heat for molding of the plastic material. Likewise, the heating after the coating of the powdery resin composition is meant for the heating after the application of the first layer of the powdery resin composition and/or the heating after the application of the second layer of the powdery resin composition, and this heating is preferably conducted to such an extent that a part of the resin in the resin composition is softened and melted so that the powder particles are bonded to one another.

In the process of the present invention, particularly in the case of an injection molding method, a blow molding method or a vacuum molding method in which the plastic material is injected under pressure for molding or the plastic material is transferred, it is particularly preferred that the mold preheating temperature, and the softening point and melting point of the resin in the powdery resin composition, satisfy a condition of (melting point $+10°$ C.)$\geq$mold preheating temperature$\geq$softening point.

If the mold preheating temperature is lower than the softening point of the resin, the bondage between the mold and the powdery resin composition will be low, and the powdery resin composition tends to move or scatter due to the movement of the plastic material caused by the pressure exerted to the plastic material during the molding operation or due to the pressure and the injection rate during the injection operation, whereby it will be difficult to obtain a uniform coating layer. On the other hand, if the mold preheating temperature exceeds the level of (melting point of the resin $+10°$ C.), the powdery resin composition melts completely and shows fluidity after coating, whereby the composition tends to move due to the movement of the plastic material or due to the pressure and the injection rate as mentioned above, whereby it will be difficult to obtain a uniform coating layer. Particularly, in the case of the injection molding method, undesirable problems are likely to be brought about, such that the coating layer tends to have a stripe-pattern, or a molded product with no coating layer in the vicinity of the injection hole (nozzle) is likely to be formed.

As described in the foregoing, according to the process of the present invention, the following advantages are obtainable.

(i) Problems relating to the safety and hygiene due to the evaporation of the organic solvent and problems such as the scattering of the powdery resin composition, the adhesion thereof outside the mold or the non-uniformity of the coating layer can be solved, and it is possible to apply the powdery resin composition to the surface of the plastic material efficiently and uniformly.

(ii) It is possible to form a coating layer containing an electrically conductive fine powder in a high concentration, whereby it is possible to obtain a molded plastic product having excellent electromagnetic wave shielding effects.

(iii) It is possible to obtain a molded plastic product having a uniform coating layer having an improved outer appearance and/or protective function.

(iv) It is possible to obtain a molded plastic product having an electrically conductive coating layer covered with an insulating coating layer, whereby it is possible not only to provide an effective electromagnetic wave shielding but also to prevent electrification or leak troubles.

(v) The insulation coating layer can be colored, and accordingly it is now possible to provide an electrically conductive coating layer on the outer surface of a casing, while such electrically conductive coating layer used to be employed only in the inner surface of a casing because the color of the conventional conductive coating layer is limited or because of the electrification problem.

(vi) In addition to the electromagnetic wave shielding effects, it is possible to absorb electromagnetic waves in a high frequency region, and when such an electromagnetic wave absorbing layer is provided as the most exterior layer, it is possible to prevent electrification or leak troubles which are likely to occur when only an electrically conductive coating layer is provided.

Now, the present invention will be described in further detail reference to Examples. However, it should be understood that the present invention is by no means restricted to these specific Examples. In these Examples, "parts" or "%" means "parts by weight" or "% by weight", respectively. Prior to the Examples, various powdery resin compositions were prepared to have the compositions identified below.

[I] Preparation of electrically conductive powdery resin compositions

Composition 1

| Epoxy resin | 12% |
| Dendrite-form copper powder | 48% |
| Flow agent | 1% |
| Methyl ethyl ketone | 39% |

As the epoxy resin, Epikote #1002 (epoxy equivalent: 600–700, melting point: 83° C., softening point: 57° C.), tradename, manufactured by Shell Chemical Co., was used. As the dendrite-form copper powder, electrolytic copper powder MD-1 [325 mesh pass (opening: 44 μm): at least 80%], tradename, manufactured by Mitsui Mining & Smelting Co., Ltd., was used. Likewise, as the flow agent, Modaflow, tradename, manufactured by Monsanto Co., was used.

The above identified composition was dispersed in a porcelain pot mill for 2 hours to obtain a liquid composition.

Then, the liquid composition was sprayed into 3000 parts of water under stirring at a high speed at a water temperature of not higher than 20° C., whereby the liquid composition was emulsified and the solvent was extracted into water to form resin particles. Thereafter, filtration and washing with water were repeated to obtain resin particles having an average particle size of about 100 μm. After adjusting the water content to a level of about 50%, the resin particles were further pulverized to obtain a slurry-like powdery resin composition. Further, washing with water was repeated at least 3 times, and the resin particles were collected by filtration, dried in dry air at a temperature of not higher than 20° C., then pulverized and sieved (150 mesh) to obtain a powdery resin composition 1 composed of conductive powder/resin=80/20 (weight ratio).

Composition 2

| Epoxy resin | 9% |
| Dendrite-form copper powder | 51% |
| Flow agent (same as in Composition 1) | 1% |
| Methyl ethyl ketone | 39% |

As the epoxy resin, Epikote #1001 (epoxy equivalent: 450–500, melting point: 69° C., softening point: 50° C.), tradename, manufactured by Shell Chemical Co., was used. As the dendrite-form copper powder, a mixture of electrolytic copper powders MD-1 and MF-$D_2$ (weight average particle size: 8 μm), tradename, manufactured by Mitsui Mining & Smelting Co., Ltd., in a weight ratio of 1:1, was used. A liquid composition was prepared in the same manner as in Composition 1, and then a powdery resin composition 2 composed of conductive fine powder/resin=85/15 (weight ratio) was prepared in the same manner as in Composition 1.

Composition 3

| Epoxy resin | 6% |
| Dendrite-form copper powder | 54% |
| Flow agent (same as in Composition 1) | 1% |
| Methyl ethyl ketone | 39% |

As the epoxy resin, Araldite 6097 (epoxy equivalent: 900–1000, melting point: 100° C., softening point: 80° C.), tradename, manufactured by Ciba-Geigy A.G., was used. Likewise, as dendrite-form copper powder, electrolytic copper powder MF-$D_2$, tradename, manufactured by Mitsui Mining & Smelting Co., Ltd., was used.

The above identified composition was dispersed by a paint shaker for 1 hour to obtain a liquid composition.

Then, an electrically conductive powder resin composition was prepared in the same manner as in Composition 1, and thereafter, as a curing agent, an imidazole-type curing agent for epoxy resin [Curezol $C_{11}Z$, tradename, manufactured by Shikoku Chemicals Corporation] was pulverized and dry-mixed in a proportion of 4 phr to obtain a powdery composition 3 composed of conductive fine powder/resin=90/10 (weight ratio).

Composition 4

| | |
|---|---|
| Epoxy resin | 15% |
| Nickel powder | 45% |
| Flow Agent (same as in Composition 1) | 1% |
| Methyl ethyl ketone | 39% |

As the epoxy resin, a mixture (melting point: 86° C., softening point: 58° C.) of Epikote #1001, #1002 and #1004 (epoxy equivalent: 875-975, melting point: 98° C., softening point: 70° C.), tradenames, manufactured by Shell Chemical Co., in a ratio of 1:1:1 (weight ratio), was used. As the nickel powder, #255 (average particle size: about 2-3 μm), tradenmae, manufactured by INCO, was used.

The above identified composition was formed into a liquid composition in the same manner as in Composition 3, and a powdery resin composition 4 composed of conductive fine powder/resin=75/25 (weight ratio) was prepared in the same manner as in Composition 1.

Composition 5

| | |
|---|---|
| Epoxy resin | 12% |
| Nickel powder | 48% |
| Methyl ethyl ketone | 40% |

As the epoxy resin, a mixture (melting point: about 107° C., softening point: 65° C.) of Epikote #1002, #1004 and 25 #1007 (epoxy equivalent: 1750-2200, melting point: 128° C., softening point: 85° C.), tradenames, manufactured by Shell Chemical Co., in a ratio of 1:1:1 (weight ratio), was used. Likewise, as the nickel powder, a mixture of #123 (average particle size: about 3-7 μm) and #255 (average particle size: about 2-3 μm), tradenames, manufactured by INCO, in a ratio of 1:1 (weight ratio), was used.

The above identified composition was dispersed in the same manner as in Composition 3 to obtain a liquid composition.

Then, a powdery resin Composition 5 composed of conductive fine powder/resin=80/20 (weight ratio) was prepared from the liquid composition in the same manner as in Composition 3.

Composition 6

| | |
|---|---|
| Epoxy resin | 9% |
| Nickel powder (same as in Composition 4) | 51% |
| Methyl ethyl ketone | 40% |

As the epoxy resin, a mixture (melting point: about 135° C., softening point: 75° C.) of Epikote #1002, #1004, #1007 and #1009 (epoxy equivalent: 2400-3300, melting point: about 148° C., softening point: 90° C.), tradenames, manufactured by Shell Chemical Co., in a ratio of 1:1:2:2 (weight ratio), was used.

The above identified composition was processed in the same manner as in Composition 3, whereby a powdery resin composition 6 composed of conductive fine powder/resin=85/15 (weight ratio) was prepared.

Composition 7

| | |
|---|---|
| Epoxy resin | 5.7% |
| Graphite carbon powder | 14% |
| Methyl ethyl ketone | 80% |
| Dicyandiamide | 0.3% |

As the epoxy resin, Epikote #1007 was used. Likewise, as the graphite carbon powder, CX-3000 (average particle size: about 3 μm), tradename, manufactured by Chuetsu Graphite Works Co., Ltd., was used.

The above identified composition was formed into a liquid composition in the same manner as in Composition 1. Then, 50 parts of methyl ethyl ketone was further added to 100 parts of the liquid composition to dilute the composition, and then a powdery resin composition 7 composed of conductive fine powder/resin=70/30 (weight ratio) was prepared by a spray dry method (air flow rate: 20 m³/min, liquid composition supply rate: 200 ml/min, inlet air temperature: 95° C., outlet air temperature: 30° C.)

Composition 8

| | |
|---|---|
| Polyester resin | 12% |
| Dendrite-form copper powder (same as in Composition 2) | 48% |
| Methyl ethyl ketone | 40% |

As the polyester resin, Finedic M-8000 (melting point: 123° C., softening point: 75° C.), tradename, manufactured by Dainippon Ink & Chemicals, Inc. was used.

The above identified composition was dispersed in a porcelain pot mill for 1 hour and half to obtain a liquid composition, and a powdery resin composition 8 composed of conductive fine powder/resin=80/20 (weight ratio) was prepared form the liquid composition in the same manner as in Composition 1.

Composition 9

| | |
|---|---|
| Polyester resin (same as in Composition 8) | 12% |
| Nickel powder (same as in Composition 5) | 48% |
| Methyl ethyl ketone | 40% |

The above identified composition was processed in the same manner as in Composition 7, whereby a powdery resin composition 9 composed of conductive fine powdery/resin=80/20 (weight ratio) was prepared.

Composition 10

| | |
|---|---|
| Polyester resin | 9% |
| Copper powder | 51% |
| Methyl ethyl ketone | 40% |

As the polyester resin, GV-110 (melting point: 85° C., softening point: 65° C.), tradename, manufactured by Japan Upica Co., Ltd., was used. Likewise, as the copper powder, 4L3 (350 mesh pass: at least 95%), tradename, manufactured by Fukuda Metal Foil & Powder Co., Ltd., was used.

The above identified composition was processed in the same manner as in Composition 8, whereby a powdery resin composition 10 composed of conductive fine powder/resin=85/15 (weight ratio) was prepared.

Composition 11

| Acrylic resin | 9% |
|---|---|
| Nickel powder (same as in Composition 4) | 51% |
| Methyl ethyl ketone | 40% |

As the acrylic resin, A-224S (melting point: 114° C., softening point: 70° C.), tradename, manufactured by Dainippon Ink & Chemicals, Inc., was used.

The above identified composition was processed in the same manner as in Composition 5, whereby a powdery resin composition 11 composed of conductive fine powder/resin=85/15 (weight ratio) was prepared.

Composition 12

| Epoxy resin | 45% |
|---|---|
| Dendrite-form copper powder (same as in Composition 1) | 5% |
| Methyl ethyl ketone | 50% |

As the epoxy resin, a mixture (melting point: 101° C., softening point: 64° C.) of Epikote #1001, #1002, #1004 and #1007 in a weight proportion of 5:20:47:15 was used.

The above identified composition was processed in the same manner as in Composition 1 to obtain a powdery resin containing 10% of an electrically conductive fine powder. Then, 3 parts by weight of fine powdery dicyandiamide and 517 parts by weight of the above-mentioned dendrite-form copper powder were uniformly dry-mixed to 100 parts by weight the powdery resin, whereby a powdery resin composition 12 having a total content of the electrically conductive fine powder of 85% was obtained.

Composition 13

| Epoxy resin | 40% |
|---|---|
| Dendrite-form copper powder (same as in Composition 2) | 10% |
| Methyl ethyl ketone | 50% |

As the epoxy resin, a mixture (melting point: 90° C., softening point: 61° C.) of Epikote #1001, #1002 and #1004, tradename, manufactured by Shell Chemical Co., in a weight ratio of 10:40:30, was used.

The above identified composition was processed in the same manner as in Composition 1 to obtain a powdery resin. Then, 300 parts by weight of the above dendrite-form mixed copper powder was uniformly dry-mixed to 100 parts by weight of the powdery resin thereby obtained, whereby a powdery resin composition 13 having a total content of the electrically conductive fine powder of 80% was obtained.

Composition 14

| Epoxy resin (same as in Composition 1) | 49.5 parts |
|---|---|
| Dendtrite-form copper powder (same as in Composition 3) | 49.5 parts |
| Flow agent (same as in Composition 1) | 1.0 part |
| Methyl ethyl ketone | 100 parts |

The above identified composition was processed in the same manner as in Composition 1 to obtain a powdery resin containing 49.5% of the dendrite-form copper powder.

Then, 100.5 parts by weight of the dendrite-form copper powder MF-D$_2$ was uniformly dry-mixed to 100 parts by weight of the powdery resin thus obtained, whereby a powdery resin composition 14 having a total content of the electrically conductive fine powder of 75%, was obtained.

Composition 15

| Epoxy resin | 80% |
|---|---|
| Nickel powder (same as in Composition 4) | 20% |

As the epoxy resin, a mixture (melting point: 121° C., softening point: 75° C.) of Epikote #1002, #1004, #1007 and #1009, tradenames, manufactured by Shell Chemical Co., in a weight ratio of 10:30:10:30, was used.

The above identified composition was melt-kneaded at a melting temperature of 155° C. by heating rollers, then cooled and pulverized. Then, the pulverized particles were passed through a 100 mesh sieve to obtain a powdery resin containing 20% of a nickel powder.

Then, 700 parts by weight of the above nickel powder #255 was uniformly dry-mixed to 100 parts by weight of the above powdery resin, whereby a powdery resin composition 15 having a total content of the electrically conductive fine powder of 90%, was obtained.

Composition 16

| Epoxy resin | 48% |
|---|---|
| Nickel powder (same as in Composition 5) | 49.5% |
| Dicyandiamide | 1.5% |
| Flow agent (same as in Composition 1) | 1.0% |

As the epoxy resin, Epikote #1004, tradename, manufactured by Shell Chemical Co., was used.

The above identified composition was kneaded at a melting temperature of 110° C. by heating rollers, and then a powdery resin containing 50% of a nickel powder, was prepared in the same manner as in Composition 15.

Then, 233 parts by weight of a mixture of the above-mentioned nickel powders #123 and #255 was uniformly dry-mixed to 100 parts by weight of the above powdery resin, whereby a powdery resin composition 16 having a total content of the electrically conductive fine powder of 85%, was obtained.

Composition 17

| Epoxy resin (same as in Composition 7) | 15% |
|---|---|
| Nickel powder | 35% |
| Methyl ethyl ketone | 50% |

As the nickel powder, nickel flake HCA-1, manufactured by NOVAMET, was used.

The above identified composition was processed in the same manner as in Composition 1 to obtain a powdery resin containing 70% of a nickel powder.

Then, 50 parts by weight of the above-mentioned nickel powder #123 was uniformly dry-mixed to 100 parts by weight of the above powdery resin, whereby a powdery resin composition 17 having a total content of the electrically conductive fine powder of 80%, was obtained.

Composition 18

| Epoxy resin | 90% |
|---|---|
| Graphite carbon powder | 10% |
| (same as in Composition 7) | |

As the epoxy resin, a mixture (melting point: 87° C., softening point: 60° C.) of Epikote #1001, #1002 and #1004, manufactured by Shell Chemical Co., in a weight ratio of 3:10:5, was used.

The above identified composition was kneaded at a melting temperature of 110° C. by heating rollers, and then a powdery resin containing 10% of a graphite carbon powder, was prepared in the same manner as in Composition 15.

Then, 200 parts by weight of the above-mentioned graphite carbon powder (CX-3000) was uniformly dry-mixed to 100 parts by weight of the above powdery resin, whereby a powdery resin Composition 18 having a total content of the electrically conductive fine powder of 70%, was obtained.

Composition 19

| Polyester resin (same as in Composition 8) | 35% |
|---|---|
| Dendrite-form copper powder | 15% |
| (same mixture as in Composition 2) | |
| Methyl ethyl ketone | 50% |

The above identified composition was processed in the same manner as in Composition 1 to obtain a powdery resin containing 30% of the dendrite-form copper powder.

Then, 367 parts by weight of the above-mentioned dendrite-form mixed copper powder was uniformly dry-mixed to 100 parts by weight of the above powdery resin, whereby a powdery resin composition 19 having a total content of the electrically conductive fine powder of 85%, was obtained.

Composition 20

| Polyester resin (same as in Composition 8) | 50% |
|---|---|
| Nickel powder | 50% |
| (same mixture as in Composition 5) | |

The above identified composition was melted and kneaded at a melting temperature of 150° C. by an extruder, and then processed in the same manner as in Composition 15, whereby a powdery resin containing 50% (weight ratio) of the nickel powder was prepared.

Then, 233 parts by weight of a mixture of nickel powders #123 and #255 in a weight ratio of 1:1, was uniformly dry-mixed to 100 parts by weight of the above powdery resin, whereby a powdery resin composition 20 of the present invention having a total content of the electrically conductive fine powder of 85%, was obtained.

Composition 21

| Polyester resin (same as in Composition 10) | 80% |
|---|---|
| Copper powder (same as in Composition 10) | 20% |

The above identified composition was kneaded at a melting temperature of 100° C. by heating rollers, and then a powdery resin containing 20% (weight ratio) of the copper powder was prepared in the same manner as in Composition 15.

Then, 300 parts by weight of the above copper powder was uniformly dry-mixed to 100 parts by weight of the above powdery resin, whereby a powdery resin composition 21 having a total content of the electrically conductive fine powder of 80% was obtained.

Composition 22

| Acrylic resin (same as in Composition 11) | 80% |
|---|---|
| Nickel powder (same as in Composition 4) | 20% |

The above identified composition was kneaded at a melting temperature of 130° C. by heating rollers, and then a powdery resin containing 20% (weight ratio) of the nickel powder was obtained in the same manner as in Composition 15.

Then, 300 parts by weight of the above identified nickel powder was uniformly dry-mixed to 100 parts by weight of the above powdery resin, whereby a powdery resin composition 22 having a total content of the electrically conductive fine powder of 80% was obtained.

[II] Preparation of insulating powdery resin compositions

Composition 23

| Epoxy resin (same as in Composition 16) | 64% |
|---|---|
| Dicyandiamide | 5% |
| Titanium oxide (rutile-type) | 30% |
| Flow agent (same as in Composition 1) | 1% |

The above identified composition was mixed and kneaded by heating rollers at a temperature of not higher than 110° C. The kneaded composition was cooled, then pulverized by a pulverizer and sieved with 100 mesh sieve to obtain a powdery resin Composition 23.

Composition 24

| Epoxy resin | 35% |
|---|---|
| Iron oxide yellow pigment | 15% |
| Methyl ethyl ketone | 50% |

As the epoxy resin, a mixture (melting point: 92° C., softening point: 65° C.) of Epikote #1002 and #1004 in a weight ratio of 1:1, was used.

The above identified composition was processed in the same manner as in Composition 1, whereby powdery resin composition 24 was obtained.

Composition 25

| Epoxy resin | 45% |
|---|---|
| (same as in Composition 1) | |
| Azo-type red pigment | 4.5% |
| Flow agent | 0.5% |
| (same as in Composition 1) | |
| Methyl ethyl ketone | 50% |

The above identified composition was processed in the same manner as in Composition 1, whereby powdery resin composition 25 was prepared.

Composition 26

| | |
|---|---|
| Epoxy resin | 68% |
| Curing agent (same as in Composition 3) | 2% |
| Titanium oxide (rutile-type) | 30% |

As the epoxy resin, a mixture (melting point: 121° C., softening point: 77° C.) of Epikote #1002, #1004 and #1007, tradenames, manufactured by Shell Chemical Co., in a weight ratio of 1:1:7, was used.

The above identified composition was kneaded by heating rollers at a temperature of not higher than 140° C., and then a powdery resin composition 26 was prepared in the same manner as in Composition 23.

Composition 27

| | |
|---|---|
| Polyester resin (same as in Composition 8) | 95% |
| Phthalocyanine blue | 5% |

The above identified composition was kneaded by heating rollers at a temperature of not higher than 135° C., and then a powdery resin composition 27 was prepared in the same manner as in Composition 23.

Composition 28

| | |
|---|---|
| Polyester resin (same as in Composition 10) | 69% |
| Titanium oxide (rutile-type) | 30% |
| Flow agent (same as in Composition 1) | 1% |

The above identified composition was kneaded by heating rollers at a temperature of not higher than 100° C., and then a powdery resin composition 28 was prepared in the same manner as in Composition 23.

Composition 29

| | |
|---|---|
| Acrylic resin (same as in Composition 11) | 70% |
| Titanium oxide (rutile-type) | 30% |

The above identified composition was kneaded by heating rollers at a temperature of not higher than 130° C., and then a powdery resin composition 29 was prepared in the same manner as in Composition 13.

Composition 30

| | |
|---|---|
| Epoxy resin (same as in Composition 26) | 96% |
| Curing agent (same as in Composition 3) | 4% |

The above identified composition was kneaded by heating rollers at a temperature of not higher than 140° C., and then a powdery resin composition 30 was prepared in the same manner as in Composition 23.

Composition 31

| | |
|---|---|
| Polyester resin (same as in Composition 10) | 99% |
| Flow agent | 1% |

(same as in Composition 1)

The above identified composition was kneaded by heating rollers at a temperature of not higher than 100° C., and then a powdery resin composition 31 was prepared in the same manner as in Composition 23.

Composition 32

Acrylic resin (same as in Composition 11)

The above acrylic resin was kneaded by heating rollers at a temperature of not higher than 130° C., and then a powdery resin composition 32 was prepared in the same manner as in Composition 23.

[III] Preparation of wave absorbing resin compositions

Composition 33

| | |
|---|---|
| Epoxy resin (same as in Composition 16) | 45% |
| Dicyandiamide | 4% |
| Mn—Zn type ferrite particles | 50% |
| (average particle size: about 1–2 μm) | |
| Flow agent (same as in Composition 1) | 1% |

The above identified composition was processed in the same manner as in Composition 23, whereby a powdery resin composition 33 was obtained.

Composition 34

| | |
|---|---|
| Epoxy resin (same mixture as in Composition 24) | 10% |
| Methyl ethyl ketone | 50% |
| Ni—Zn type ferrite particles | 40% |
| (average particle size: about 0.5–1 μm) | |

The above identified composition was processed in the same manner as in Composition 1, whereby a powdery resin composition 34 was obtained.

Composition 35

| | |
|---|---|
| Polyester resin (same as in Composition 10) | 10% |
| Mn—Zn type ferrite particles | 50% |
| (average particle size: about 1–2 μm) | |
| Methyl ethyl ketone | 40% |

The above identified composition was processed in the same manner as in Composition 1, whereby a powdery resin composition 35 was obtained.

Composition 36

| | |
|---|---|
| Acrylic resin (same as in Composition 11) | 9% |
| Ni—Zn type ferrite particles | 51% |
| (average particle size: about 0.5–1 μm) | |
| Methyl ethyl ketone | 40% |

The above identified composition was processed in the same manner as in Composition 1, whereby a powdery resin Composition 36 was obtained.

EXAMPLE 1

Masking was applied to a non-coating portion of the inner surface of a fixed mold half preheated to a temperature of 70° C., and then the powdery resin composition 1 was electrostatically coated at a voltage of −80 KV to form a coating layer. Then, the masking was removed, and a movable mold half was closed over the fixed mold half.

Then, a heat resistant polystyrene resin liquid at a resin temperature of 270° C. was injection-molded under an injection pressure of about 900 kg/cm$^2$, whereby a molded heat resistant polystyrene product having a uniform, highly conductive coating layer having a thickness of 40 μm and a surface resistance of 0.96Ω/□, was obtained.

The conductive coating layer thus obtained showed excellent shielding effects against electromagnetic waves in an electric field of from 50 to 1000 MHz, at a level of from 50 to 40 dB in the ratio of the incident electromagnetic wave intensity to the radiant electromagnetic wave intensity, as measured by spectrum-analyzer TR4172 manufactured by Takeda Riken Industry Co., Ltd.

EXAMPLE 2

Masking was applied to a non-coating portion of the inner surface of a fixed mold half preheated to a temperature of 60° C., and then the powdery resin composition 2 was electrostatically coated at a voltage of −70 KV to form a coating layer. Then, the masking was removed, and a movable mold half was closed over the fixed mold half.

Then, a vinyl chloride resin liquid at a resin temperature of 180° C. was injection-molded under an injection pressure of about 750 kg/cm$^2$, whereby a molded vinyl chloride resin product having a uniform highly conductive coating layer having a thickness of 60 μm and a surface resistance of 0.43Ω/□, was obtained.

EXAMPLE 3

Masking was applied to a non-coating portion of the inner surface of a mold preheated to a temperature of 90° C., and then the powdery resin composition 3 was electrostatically coated on the inner surface of mold at a voltage of −65 KV by means of an electrostatic coating device, to form a coating layer. Then, the masking was removed. A hard polyvinyl chloride sheet was heated to 125° C. by a heater and softened, and the softened sheet was secured to the above-mentioned mold by means of a clamp frame. Then, air in the mold was withdrawn by a vacuum pump under reduced pressure of 720 mmHg to bring in contact with and mold the sheet against the mold surface, whereby a molded hard vinyl chloride resin product having a uniform highly conductive coating layer having a thickness of 60 μm and a surface resistance of 0.35Ω/□, was obtained.

EXAMPLE 4

Masking was applied to a non-coating portion of the inner surface of a fixed mold half preheated to a temperature of 65° C., and the powdery resin composition 4 was electrostatically coated at a voltage of −60 KV to form a coating layer. Then, the masking was removed, and a movable mold half was closed over the fixed mold half. Then, a polyethylene resin liquid at a resin temperature of 220° C. was injection-molded under an injection pressure of about 1100 kg/cm$^2$, whereby a molded polyethylene resin product having a uniform highly conductive coating layer having a thickness of 50 μm and a surface resistance of 1.21Ω/□, was obtained.

EXAMPLE 5

Masking was applied to a non-coating portion of the inner surface of a fixed mold half preheated to a temperature of 70° C., and the powdery resin composition 5 was electrostatically coated at a voltage of −70 KV. Then, the masking was removed, and the mold was heated to 95° C. by an infrared heater to form a coating layer. Then, a movable mold half was closed on the fixed mold half, and an ABS resin liquid at a resin temperature of 230° C. was injection-molded under an injection pressure of about 1000 kg/cm$^2$, whereby a molded ABS resin product having a uniform highly conductive coating layer having a thickness of 60 μm and a surface resistance of 0.52Ω/□, was obtained.

EXAMPLE 6

Masking was applied to a non-coating portion of the inner surface of a mold preheated to a temperature of 87° C., and the powdery resin composition 6 was electrostatically coated on the inner surface of the mold at a voltage of −60 KV by an electrostatic coating device. Then, the masking was removed, and the inner surface of the mold was heated by an infrared heater to form a coating layer. A polypropylene extruded in a tubular shape at 195° C. was inserted in the mold, and the tube was expanded by blowing a compressed air under a pressure of 3.5 kg/cm$^2$, whereby the polypropylene was brought in close contact with and molded against the inner surface of the mold. Thus, a molded polypropylene resin product having a uniform highly conductive coating layer having a thickness of 60 μm and a surface resistance of 0.43Ω/□, was obtained.

EXAMPLE 7

Masking was applied to a non-coating portion of the inner surface of a mold preheated to a temperature of 125° C., and the powdery resin composition 7 was electrostatically coated on the inner surface of the mold at a voltage of −70 KV by an electrostatic coating device, to form a coating layer. Then, the masking was removed, and a phenol resin powder preheated to a temperature of 116° C. was poured into the mold, and after closing the mold, heated to a temperature of 155° C. and compression-molded under a pressure of 180 kg/cm$^2$, whereby a molded phenol resin product having a uniform highly conductive coating layer having a thickness of 50 μm and a surface resistance of 300Ω/□, was obtained.

EXAMPLE 8

Masking was applied to a non-coating portion of the inner surface of a fixed mold half preheated to a temperature of 120° C., and the powdery resin composition 8 was electrostatically coated at a voltage of −70 KV to form a coating layer. Then, the masking was removed, a movable mold half was closed over the fixed mold half. Then, a polycarbonate resin liquid at a resin temperature of 260° C. was injection-molded under an injection pressure of 1500 kg/cm$^2$, whereby a molded polycarbonate resin product having a uniform highly conductive coating layer having a thickness of 40 μm and a surface resistance of 1.1 Ω/□, was obtained.

EXAMPLE 9

Masking was applied to a non-coating portion of the inner surface of a fixed mold half preheated to a temperature of 105° C., and the powdery resin composition 9 was electrostatically coated at a voltage of −60 KV to form a coating layer. Then, the masking was removed, and a movable mold half was closed on the fixed mold half. A PPO(polyphenylene oxide) resin at a resin temperature of 330° C. was injection-molded under an injection pressure of 1500 kg/cm² to obtain a molded PPO resin product. The surface conductive coating layer was a highly conductive coating layer having an average thickness of 40 μm and a surface resistance of 1.3 Ω/□, although some irregularities were formed on the coating surface in the vicinity of the nozzle from which the resin was injected.

EXAMPLE 10

Masking was applied to a non-coating portion of the inner surface of a mold preheated to a temperature of 90° C., and the powdery resin composition 10 was electrostatically coated on the inner surface of the mold by an electrostatic coating device to form a coating layer. Then, the masking was removed. A polyethylene resin extruded in a form of a tube at a temperature of 175° C., was inserted in the mold. Then, a compressed air was blown under a pressure of 3.2 kg/cm² to expand the tube and to bring into contact and mold the tube against the inner surface of the mold, whereby a molded polyethylene resin product having a uniform highly conductive coating layer having a thickness of 60 μm and a surface resistance of 0.53 Ω/□, was obtained.

EXAMPLE 11

Masking was applied to a non-coating portion of the inner surface of a fixed mold half preheated to a temperature of 105° C., and the powdery resin composition 11 was electrostatically coated at a voltage of −80 KV to form a coating layer. Then, the masking was removed, and a movable mold half was closed over the fixed mold half. Then, a propylene resin liquid at a resin temperature of 240° C. was injection-molded under an injection pressure of 1500 kg/cm², whereby a molded polypropylene resin product having a uniform highly conductive coating layer having a thickness of 60 μm and a surface resistance of 0.48Ω/□, was obtained.

EXAMPLE 12

Masking was applied to a non-coating portion of the inner surface of a mold preheated to a temperature of 90° C., and the powdery resin composition 12 was electrostatically coated on the inner surface of mold at a voltage of −65 KV by an electrostatic coating device to form a coating layer. Then, the masking was removed. A hard polyvinyl chloride sheet was heated to 125° C. by a heater and softened. The softened sheet was fixed on the above mold by means of a clamp frame, and the air in the mold was withdrawn by a vacuum pump under reduced pressure of 720 mmHg to bring into contact with and mold the sheet against the surface of the mold, whereby a molded hard vinyl chloride resin product having a uniform highly conductive coating layer having a thickness of 60 μm and a surface resistance of 0.35Ω/□, was obtained.

EXAMPLE 13

Masking was applied to a non-coating portion of the inner surface of a fixed mold half preheated to a temperature of 70° C., and the powdery resin composition 13 was electrostatically coated at a voltage of −80 KV to form a coating layer. Then, the masking was removed and a movable mold half was closed over the fixed mold half, and a heat resistant polystyrene resin liquid at a resin temperature of 270° C. was injection-molded under an injection pressure of about 900 kg/cm², whereby a molded heat resistant polystyrene product having a uniform highly conductive coating layer having a thickness of 40 μm and a surface resistance of 0.75Ω/□, was obtained.

The conductive coating layer thus obtained showed excellent shielding effects against electromagnetic waves in an electric field of from 50 to 1000 MHz at a level of from 50 to 40 dB in a ratio of the incident electromagnetic wave intensity to the radiant electromagnetic wave intensity as measured in the same manner as in Example 1.

EXAMPLE 14

Masking was applied to a non-coating portion of the inner surface of a fixed mold half preheated to a temperature of 60° C., and the powdery resin composition 14 was electrostatically coated at a voltage of −70 KV. Then, the masking was removed, and the mold was heated to a temperature of 95° C. by an infrared heater to form a coating layer. Then, a movable mold half was closed over the fixed mold half, and an ABS resin liquid at a resin temperature of 230° C. was injection-molded under an injection pressure of about 1000 kg/cm², whereby a formed ABS resin product having a uniform highly conductive coating layer having a thickness of 60 μm and a surface resistance of 0.48Ω/□, was obtained.

EXAMPLE 15

In the same manner as in Example 13, the powdery resin composition 15 was electrostatically coated at a voltage of −80 KV on the inner surface of a mold preheated to a temperature of 105° C., and then a polypropylene resin liquid was injection-molded under an injection pressure of 1500 kg/cm², whereby a molded product having a uniform highly conductive coating layer having a thickness of 50 μm and a surface resistance of 0.60Ω/□, was obtained.

EXAMPLE 16

Masking was applied to a non-coating layer of the inner surface of a mold preheated to 87° C., and the powdery resin composition 16 was electrostatically coated on the inner surface of the mold at a voltage of −60 KV by an electrostatic coating device. Then, the masking was removed, and the inner surface of the mold was heated by an infrared heater to form a coating layer. A polypropylene extruded in a form of a tube at 195° C., was inserted in the mold, and a compressed air was blown into the tube under a pressure of 3.5 kg/cm² to expaned the tube and to bring into contact with and mold the polypropylene against the inner surface of the mold, whereby a molded polypropylene resin product having a uniform highly conductive coating layer having a thickness of 60 μm and a surface resistance of 0.40Ω/□, was obtained.

EXAMPLE 17

By using the powdery resin composition 17, a polycarbonate resin was injection-molded (mold preheating temperature: 120° C., injection pressure: 1500 kg/cm²) in the same manner as in Example 8, whereby a molded product having a uniform highly conductive coating layer having a thickness of 60 μm and a surface resistance of 0.47Ω/□, was obtained.

EXAMPLE 18

By using the powdery resin composition 18, a polyethylene resin was injection-molded in the same manner as in Example 13, whereby a molded product having a uniform highly conductive coating layer having a thickness of 50 μm and a surface resistance of 280Ω/□, was obtained.

EXAMPLE 19

Masking was applied to a non-coating portion of the inner surface of a mold preheated to a temperature of 125° C., and the powdery resin composition 19 was electrostatically coated on the inner surface of the mold at a voltage of −70 KV by an electrostatic coating device to form a coating layer. Then, the masking was removed, and a phenol resin powder preheated to a temperature of 116° C. was poured into the mold. Then, the mold was closed and heated to 155° C., and compression molding was conducted under a pressure of 180 kg/cm$^2$, whereby a molded phenol resin product having a uniform highly conductive coating layer having a thickness of 60 μm and a surface resistance of 0.48Ω/□, was obtained.

EXAMPLE 20

Masking was applied to a non-coating portion of the inner surface of a fixed mold half preheated to a temperature of 90° C., and the powdery resin Composition 20 was electrostatically coated at a voltage of −70 KV to form a coating layer. Then, the masking was removed, and a movable mold half was closed over the fixed mold half. A glass fiber reinforced thermoplastic polyester resin solution at a resin temperature of from 270° to 280° C., was injection-molded under an injection pressure of about 1500 kg/cm$^2$, whereby a molded resin product having a uniform highly conductive coating layer having a thickness of 60 μm and a surface resistance of 0.45Ω/□, was obtained.

EXAMPLE 21

By using the powdery resin Composition 21, a polyethylene resin was molded in the same manner as in Example 16, whereby a molded product having a uniform highly conductive coating layer having a thickness of 50 μm and a surface resistance of 0.70Ω/□, was obtained.

EXAMPLE 22

On a SMC plate having a size of 200×140 mm and a thickness of 2 mm, an antistatic coating material (Colcoat NR-121X, tradename, manufactured by Colcoat Co., Ltd.) was coated to form an electrically conductive coating layer having a surface resistance of 10$^9$Ω/□.

Then, a rectangular portion having a size of 160×110 mm at the center was masked, and the powdery resin composition 22 was electrostatically coated at a voltage of −70 KV. Then, the masking was removed, and the coated plate was heated in a dryer at a temperature of 150° C. for 15 minutes, whereby a uniform highly conductive coating layer useful as a rectangular earth terminal with a width of about 20 mm and having a thickness of 60 μm and a surface resistance of 0.40Ω/□, was obtained.

EXAMPLE 23

Masking was applied to a non-coating portion of the inner surface of a fixed mold half preheated to a temperature of 85° C., and the powdery resin composition 23 was electrostatically coated at a voltage of −80 KV to form a coating layer. Then, the masking was removed, and a movable mold half was closed over the fixed mold half. A Nylon 66 resin liquid at a resin temperature of 300° C., was injection-molded under an injection pressure of about 1500 kg/cm$^2$, whereby a molded Nylon 66 resin product having an insulating and protective layer having an improved outer appearance and a thickness of 55 μm with the surface being smooth and with excellent bondage, was obtained.

EXAMPLES 24 to 29

In the same manner as in Example 23, plastic materials were injection-molded under the conditions identified in Table 1.

TABLE 1

| Example No. | Mold pre-heating temperature | Powdery resin compositions Composition No. | Layer thickness | Plastic material |
| --- | --- | --- | --- | --- |
| 24 | 80° C. | (24) | 65 μm | ABS resin |
| 25 | 65° C. | (25) | 50 μm | Polyethylene |
| 26 | 120° C. | (26) | 70 μm | Polycarbonate |
| 27 | 130° C. | (27) | 45 μm | Polyphenylene oxide |
| 28 | 70° C. | (28) | 55 μm | Polystyrene |
| 29 | 105° C. | (29) | 65 μm | Polypropylene |

EXAMPLE 30

Masking was applied to a non-coating portion of the inner surface of a fixed mold half preheated to a temperature of 80° C., and an insulating powdery resin composition 23 was electrostatically coated at a voltage of −80 KV to form a coating layer. Then, the masking was partially removed at the portions corresponding to both ends of a molded product, in order to finally measure the surface resistance of an electrically conductive coating layer.

Then, an electrically conductive powdery resin Composition 1 was electrostatically coated at a voltage of −40 KV to form a coating layer, and then the rest of the masking was removed. A movable mold half was closed over the fixed mold half. Then, a heat resistant polystyrene resin liquid at a resin temperature of 270° C. was injection-molded under an injection pressure of about 900 kg/cm$^2$, whereby a shaped heat resistant polystyrene product having a uniform highly conductive coating layer having a thickness of 40 μm and a surface resistance of 0.85Ω/□ and a white insulating coating layer thereon having a thickness of 40 μm, was obtained.

The conductive coating layer thus obtained, showed excellent shielding effects against electromagnetic waves in an electric field of from 50 to 1000 MHz at a level of from 50 to 40 dB in a ratio of the incident electromagnetic wave intensity to the radiant electromagnetic wave intensity, as measured in the same manner as in Example 1.

EXAMPLES 31 to 39

In the same manner as in Example 30, plastic materials were molded by using the powdery resin composition under the conditions identified in Table 2.

TABLE 2

| Example No. | Mold temp. Pre-heating | Mold temp. Post heating | First layer Powdery resin composition Composition No. | First layer Powdery resin composition Layer thickness | Second layer Powdery resin composition Composition No. | Second layer Powdery resin composition Layer thickness | Surface resistance (Ω/□) | Molding method | Plastic material |
|---|---|---|---|---|---|---|---|---|---|
| 31 | 60° C. | — | (25) | 40 μm | (2) | 60 μm | 0.51 | Injection molding | Vinyl chloride resin |
| 32 | 90° C. | — | (32) | 40 μm | (3) | 60 μm | 0.45 | Vacuum molding | Hard vinyl chloride resin |
| 33 | 70° C. | — | (25) | 50 μm | (4) | 50 μm | 1.1 | Injection molding | Polyethylene |
| 34 | 80° C. | 95° C. | (31) | 50 μm | (5) | 60 μm | 0.55 | Injection molding | ABS resin |
| 35 | 87° C. | 100° C. | (27) | 50 μm | (6) | 60 μm | 0.39 | Blow molding | Polypropylene |
| 36 | 120° C. | — | (30) | 50 μm | (8) | 40 μm | 1.05 | Injection molding | Polycarbonate |
| 37 | 120° C. | — | (27) | 40 μm | (9) | 50 μm | 1.2 | Injection molding | Polphenylene oxide |
| 38 | 80° C. | — | (32) | 40 μm | (10) | 60 μm | 0.65 | Blow molding | Polyethylene |
| 39 | 105° C. | — | (32) | 40 μm | (11) | 60 μm | 0.55 | Injection molding | Polypropylene |

EXAMPLE 40

Masking was applied to a non-coating portion of the inner surface of a fixed mold half preheated to a temperature of 80° C., and then the wave absorbing powdery resin composition 33 was electrostatically coated at a voltage of −80 KV to form a coating layer.

Then, the masking was partially removed at the portions corresponding to both ends of a molded product in order to finally measure the surface resistance of an electrically conductive coating layer.

Then, the electrically conductive powdery resin composition 1 was electrostatically coated at a voltage of −40 KV to form a coating layer, and the rest of the masking was removed. A movable mold half was closed over the fixed mold half.

Then, a heat resistant polystyrene resin liquid at a resin temperature of 270° C. was injection-molded under an injection pressure of about 900 kg/cm², whereby a molded heat resistant polystyrene product having a uniform highly conductive coating layer having a thickness of 40 μm and a surface resistance of 0.81Ω/□ and a wave absorbing coating layer thereon having a thickness of 60 μm, was obtained.

EXAMPLES 41 to 49

Plastic materials were molded in the same manner as in Example 40 by using the powdery resin compositions under the conditions identified in Table 3, whereby molded plastic products were obtained.

TABLE 3

| Example No. | Mold temp. Pre-heating | Mold temp. Post heating | First layer Powdery resin composition Composition No. | First layer Powdery resin composition Layer thickness | Surface resistance (Ω/□) | Second layer Powdery resin composition Composition No. | Second layer Powdery resin composition Layer thickness | Surface resistance (Ω/□) | Molding method | Plastic material |
|---|---|---|---|---|---|---|---|---|---|---|
| 41 | 70° C. | — | (34) | 40 μm | — | (2) | 60 μm | 0.55 | Injection molding | Vinyl chloride resin |
| 42 | 90° C. | — | (33) | 40 μm | — | (3) | 60 μm | 0.47 | Vacuum molding | Hard vinyl chloride resin |
| 43 | 70° C. | — | (5) | 60 μm | 1.0 | (34) | 40 μm | — | Injection molding | Polyethylene |
| 44 | 80° C. | — | (33) | 50 μm | — | (6) | 60 μm | 0.60 | Injection molding | ABS resin |
| 45 | 87° C. | 100° C. | (36) | 50 μm | — | (5) | 60 μm | 0.10 | Blow molding | Polypropylene |
| 46 | 100° C. | — | (34) | 50 μm | — | (8) | 40 μm | 1.1 | Injection molding | Polycarbonate |
| 47 | 85° C. | — | (33) | 40 μm | — | (11) | 50 μm | 0.95 | Injection molding | Polphenylene oxide |
| 48 | 95° C. | — | (35) | 40 μm | — | (8) | 60 μm | 0.67 | Blow molding | Polyethylene |
| 49 | 105° C. | — | (36) | 40 μm | — | (11) | 60 μm | 0.51 | Injection molding | Polypropylene |

We claim:

1. A molding process for producing a molded plastic product with a resin coating layer formed on its surface, which comprises electrostatically coating an electrically conductive powdery resin composition on the inner surface of a mold, filling and molding a plastic material in the mold to form a molded plastic product, and plasticizing, under compression, said electrically conductive powdery resin composition by the heat of the filled plastic material and/or by the heat for molding the filled plastic material, to form an electrically conductive resin coating layer securely bonded to the surface of the molded plastic product by anchor effect, wherein the electrically conductive powdery resin composition is a thermoplastic or thermosetting powdery resin composition containing from 70 to 95% by weight of an electrically conductive fine powder, and having a particle size of from 0.5 to 100 μm.

2. The molding process according to claim 1, wherein an insulating powdery resin composition is electrostatically coated on the inner surface of a mold prior to the electrostatic coating of the electrically conductive powdery resin composition, to eventually form an insulating resin coating layer on the electrically conductive resin coating layer.

3. The molding process according to claim 2, wherein the insulating powdery resin composition is a thermoplastic or thermosetting powdery resin composition containing from 0.5 to 50% by weight of a coloring pigment.

4. The molding process according to claim 1, wherein an electromagnetic wave absorbing powdery resin composition is electrostatically coated on the inner surface of a mold prior or subsequent to the electrostatic coating of the electrically conductive powdery resin composition, to eventually form an electromagnetic wave absorbing resin layer on or beneath the electrically conductive resin coating layer.

5. The molding process according to claim 4, wherein the wave absorbing powdery resin composition is a thermoplastic or thermosetting powdery resin composition containing from 50 to 95% by weight of an electromagnetic wave absorbing fine powder.

6. The molding process according to claim 1, wherein the plastic material is molded by injection molding, blow molding, transfer molding or vacuum molding.

7. The molding process according to claim 1, wherein the mold is preheated.

8. The molding process according to claim 1, wherein the powdery resin composition is fused or cured by heating prior to the filing of the plastic material.

9. The molding process according to claim 7, wherein the melting point and the softening point of the resin component used for the powdery resin composition and the preheating temperature of the mold satisfy the condition of (melting point $+10°$ C.)$\geq$preheating temperature of the mold$\geq$softening point.

10. The molding process according to claim 1, wherein the electrically conductive fine powder is a fine metal powder in the form of dendrite.

11. The molding process according to claim 1, wherein the powdery resin composition is a mixture of electrically conductive fine powder particles and insulating resin powder particles containing electrically conductive fine powder particles.

12. The molding process according to claim 4, wherein the electrically condutive powder is a metal fine powder in the form of dendrite, and the wave absorbing powder is a spinel-type ferrite powder.

13. The molding process according to claim 2, wherein the electrically conductive powdery resin composition is a powdery resin composition prepared by a precipitation method wherein a liquid composition comprising a water soluble solvent, a water-insoluble resin which is soluble in said solvent and an electrically conductive fine powder, is dispersed in water and subjected to granulation with extraction of the solvent into water, followed by separation and drying of the formed resin particles, and the insulating powdery resin composition is a powdery resin composition prepared by a precipitation method wherein a liquid composition comprising a water soluble solvent, a water-insoluble resin which is soluble in said solvent and optionally a coloring pigment, is dispersed in water and subjected to granulation with extraction of the solvent into water, followed by separation and drying of the formed resin particles.

14. The molding process according to claim 4, wherein the electrically conductive powdery resin composition is a powdery resin composition prepared by a precipitation method wherein a liquid composition comprising a water soluble solvent, a water-insoluble resin which is soluble in said solvent and an electrically conductive fine powder, is dispersed in water and subjected to granulation with extraction of the solvent into water, followed by separation and drying the formed resin particles, and the wave absorbing powdery resin composition is a powdery resin composition prepared by a precipitation method wherein a liquid composition comprising a water soluble solvent, a water-insoluble resin which is soluble in said solvent and an electromagnetic wave absorbing fine powder, is dispersed in water and subjected to granulation with extraction of the solvent into water, followed by separation and drying of the formed resin particles.

* * * * *